United States Patent [19]

Ross et al.

[11] 4,179,228
[45] Dec. 18, 1979

[54] NUMERICALLY CONTROLLED MILLING WITH PARABOLIC PROFILE TOOLS FOR SURFACE SMOOTHNESS

[75] Inventors: Joseph A. Ross, Fort Salonga; Howard K. Stern, Greenlawn, both of N.Y.

[73] Assignee: Solid Photography Inc., Melville, N.Y.

[21] Appl. No.: 926,930

[22] Filed: Jul. 21, 1978

Related U.S. Application Data

[62] Division of Ser. No. 801,818, May 31, 1977.

[51] Int. Cl.² .............................................. B23C 5/04
[52] U.S. Cl. ...................................................... 407/57
[58] Field of Search ........................ 407/53, 54, 55, 56, 407/57; 90/11 C, 13 C

[56] References Cited

U.S. PATENT DOCUMENTS

| | | | |
|---|---|---|---|
| 938,434 | 10/1909 | Pierpont | 407/57 |
| 3,042,994 | 7/1962 | Ruggeberg | 407/54 X |

Primary Examiner—Z. R. Bilinsky
Attorney, Agent, or Firm—Max Fogiel

[57] ABSTRACT

An arrangement for machining surfaces with a numerically controlled tool in which the tool is provided with a parabolic profile to obtain a substantially smooth surface finish. The workpiece to be machined is moved relative to the cutting tool in substantially a plane of the workpiece. After milling a contour along that plane, the workpiece or the tool is incremented to an adjacent parallel plane for the purpose of milling another contour on the workpiece. The slope of the surface element on the workpiece between the adjacent planes is computed, and the cutting tool is oriented so that the portion of the tool in contact with the workpiece along that surface element, possesses the computed slope. The cutting tool may be formed with cutting edges having straight-line segments interconnected and directed substantially along a parabolic surface. The slopes on the cutting edges of the tool vary in magnitude from substantially zero to infinity.

2 Claims, 19 Drawing Figures

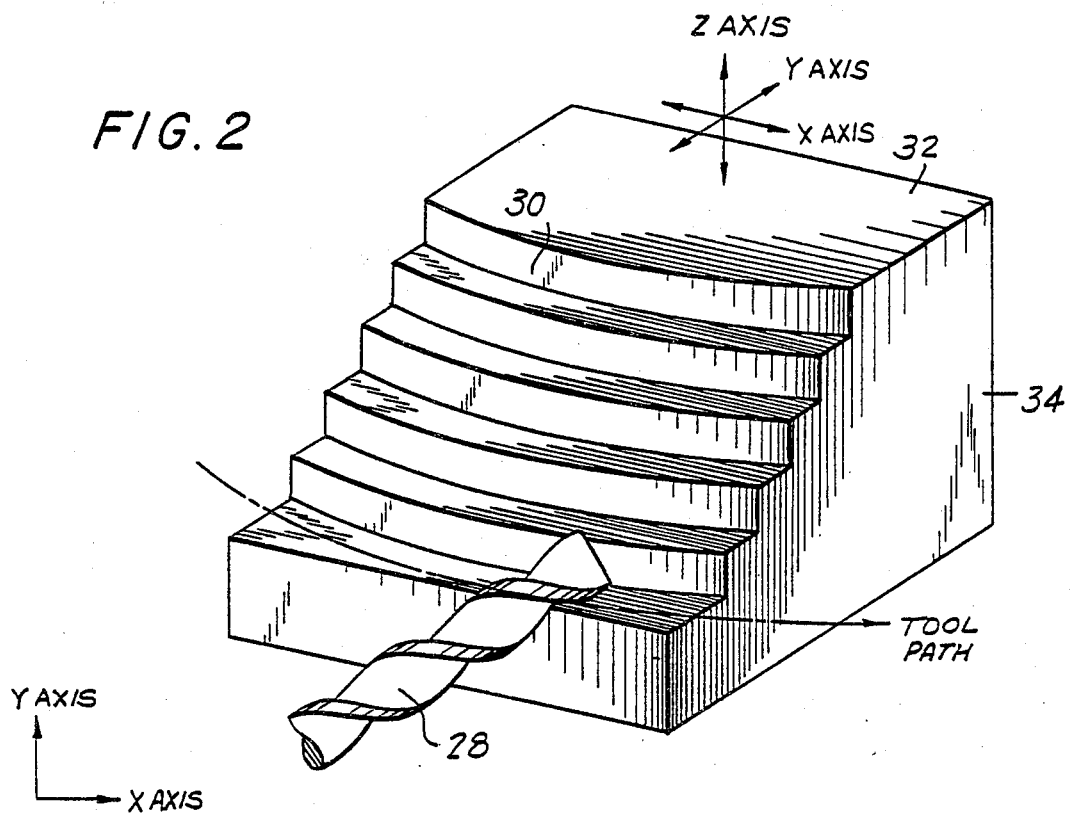
FIG. 2
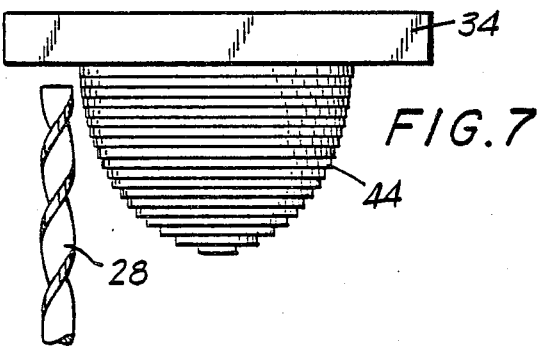
FIG. 7
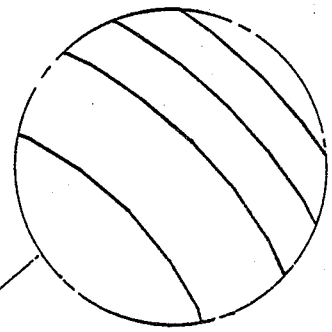
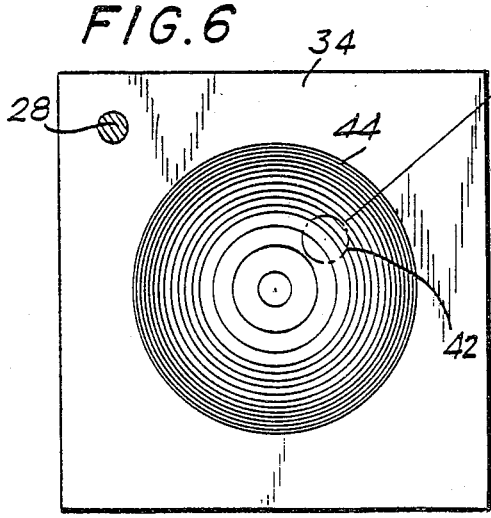
FIG. 6
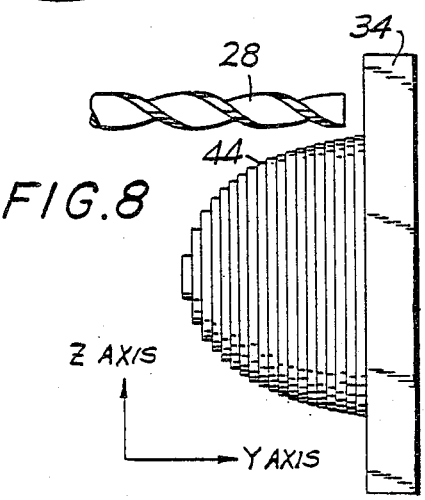
FIG. 8

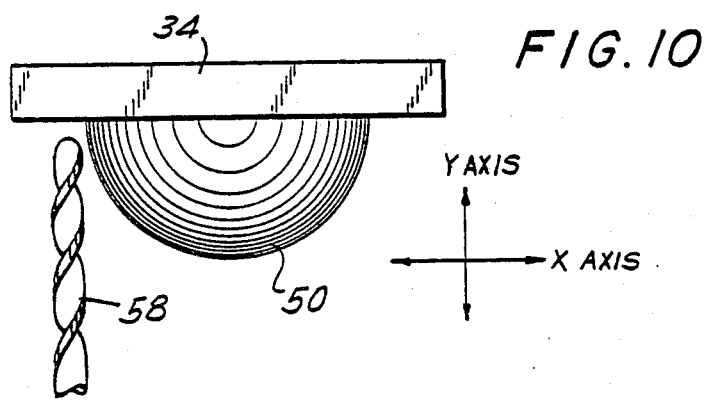
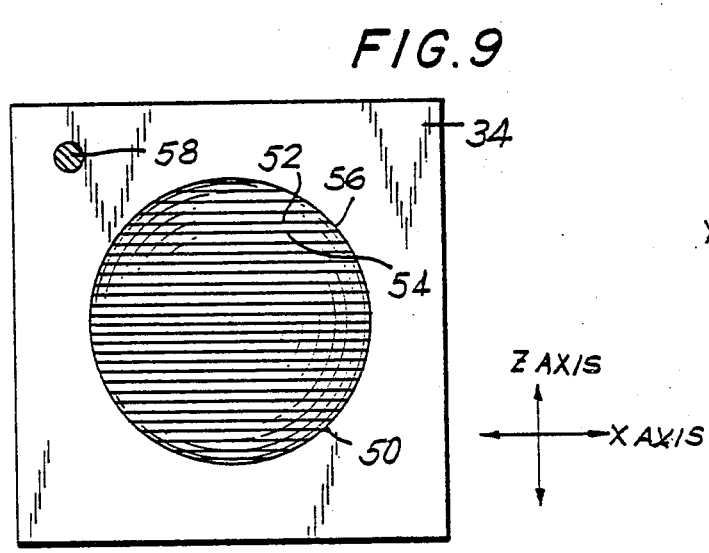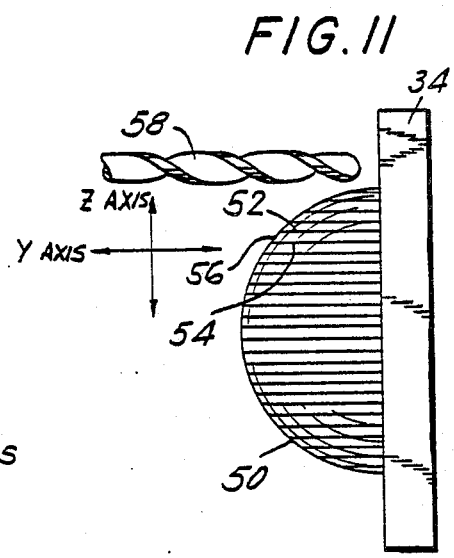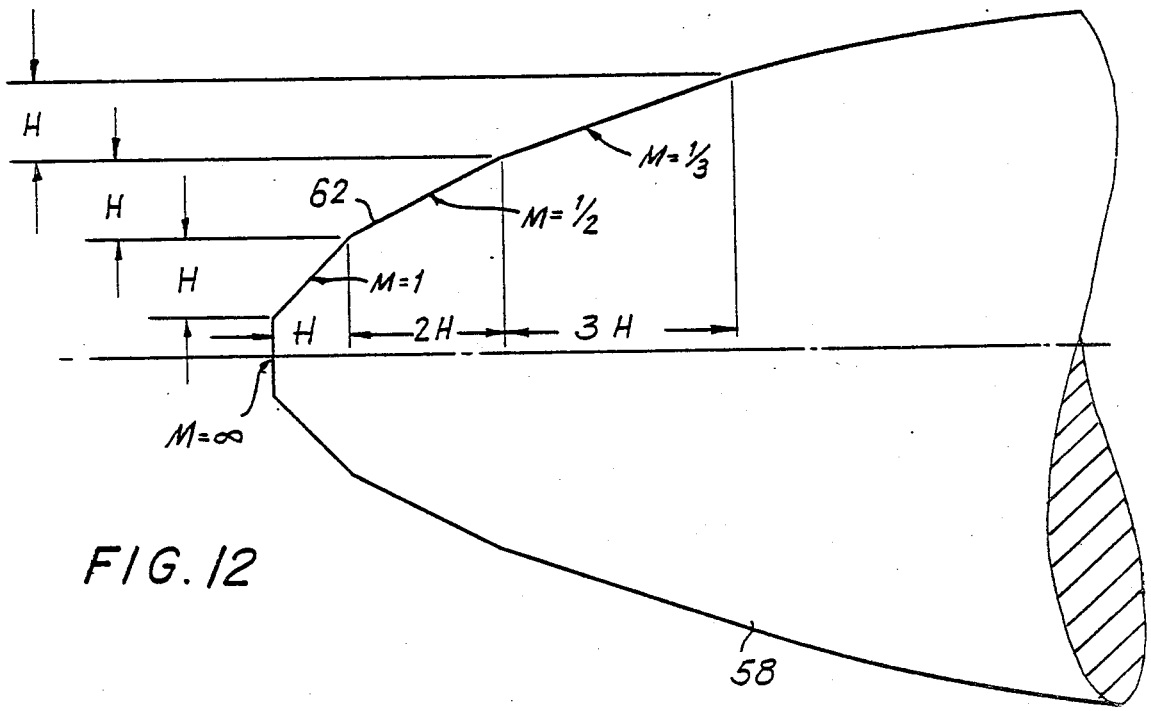

SLOPES (M) = ∞, 1, ½, ⅓

SLOPES (M) = ∞, 2, 1, ⅔, ½

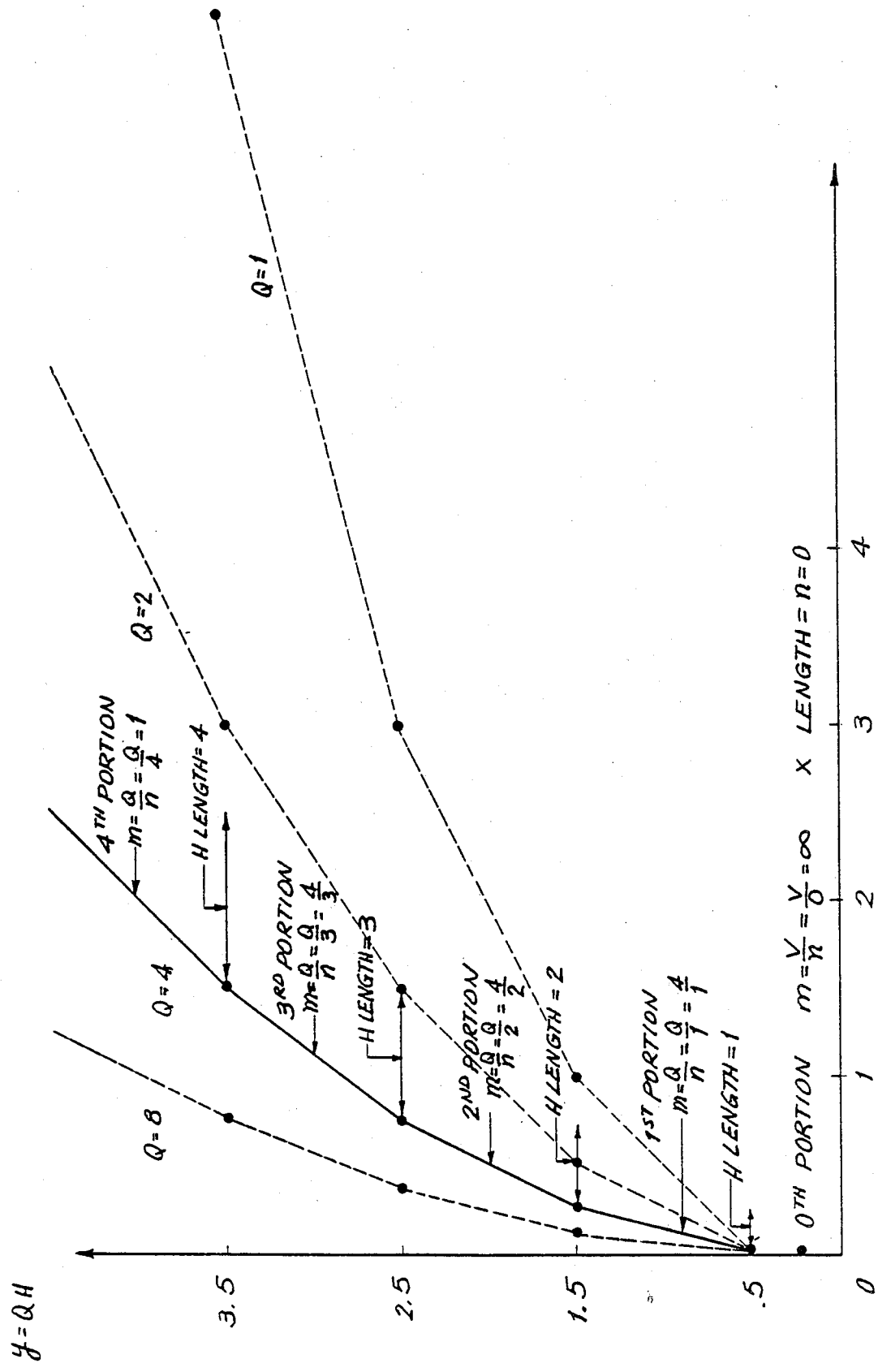

NUMERICALLY CONTROLLED MILLING WITH PARABOLIC PROFILE TOOLS FOR SURFACE SMOOTHNESS

This is a division of application Ser. No. 801,818 filed May 31, 1977.

BACKGROUND OF THE INVENTION

In the machining of surfaces with conventional cutting tools in numerically controlled milling machines, for example, a substantially rough surface finish is obtained after the machining process has been completed. This is particularly true when the surfaces being machined have varying curvatures.

When using a conventional ball end mill or a flat face end mill, for example, ridges are formed on the machine end surface along the contours that are cut with the end mills. These ridges result in applying a rough surface finish to the machined workpiece.

A basic deficiency of the conventional milling procedures is that the slopes of the workpiece between milled contours is not taken into account. There is no provision in the conventional milling procedures for adapting the cutting tool to the varying slopes of the workpiece between contours.

Accordingly, it is an object of the present invention to provide an arrangement in which a numerically controlled milling process results in a substantially smooth surface finish of the workpiece.

Another object of the present invention is to provide an arrangement of the foregoing character, which may be easily and economically applied.

SUMMARY OF THE INVENTION

The objects of the present invention are achieved by providing a cutting tool with a substantially parabolic profile. The profile may be comprised of straight-line segments interconnected and directed along a parabolic surface. At the same time, the cutting tool may be formed with cutting edges shaped to result in a smooth parabolic profile of the tool.

To machine a surface of a general shape, a contour is cut on the workpiece along a predetermined plane. This cutting action results from relative movement between the tool and the workpiece. The relative movement may be obtained by holding the axis of the tool stationary while moving the workpiece, or vice versa. Movements of both the tool and the workpiece may also be combined for purposes of obtaining the desired relative cutting action to generate the contour.

After the contour has been cut, the tool and/or the workpiece is incremented to an adjacent parallel plane for the purpose of cutting another contour.

In cutting the contours, in accordance with the present invention, the slopes of the desired machined surface on the workpiece is computed, and the workpiece is oriented so that the cutting edges on the tool in contact with the workpiece at the contours, possess the computed slope. The computed slope may be selected from a series of slopes available on the cutting tool with the parabolic profile. The cutting tool serves as a storage or library of cutting slopes in the range of substantially zero to infinity. During the milling process, the cutting tool may be rotated about its axis so that the cutting edges along the parabolic profile of the tool apply cutting action to the workpiece.

The novel features which are considered as characteristic for the invention are set forth in particular to the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a perspective view and shows a flat face end mill in relation to a workpiece being machined;

FIG. 6 is a front view of a workpiece milled with a flat face end mill along contours arranged perpendicular to contours shown on the workpiece in FIG. 3;

FIG. 7 is a plan view of the workpiece of FIG. 6;

FIG. 8 is a side view of the workpiece of FIG. 6;

FIG. 9 is a front view of the surface finish of a workpiece machined with a parabolic profile cutting tool, in accordance with the present invention;

FIG. 10 is a plan view of the workpiece of FIG. 9;

FIG. 11 is a side view of the workpiece of FIG. 9;

FIG. 12 is a diagrammatic view of a parabolic profile tool, in accordance with the present invention;

FIG. 16 is a graphical representation of cutting tools with varying parabolic profiles;

DESCRIPTION OF THE PREFERRED EMBODIMENTS

Figure 1:
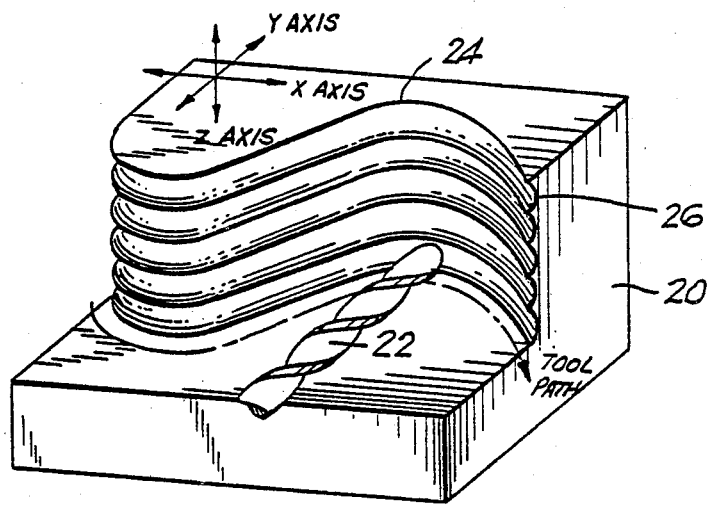
FIG. 1 is a perspective view and shows a ball end mill in relation to a workpiece being machined.

Referring to FIG. 1, there is shown a block of material 20 which is to be machined with a cutting tool 22 so as to result in a contoured surface 24.

If the cutting tool 22 is a ball end mill, having a conventional rounded tip, for example, the surface 24 after machining, will possess ridges 26 which result in the surface not being smoothly finished. Thus, a profiled or contoured surface 24 is formed by first moving the cutting tool 22 in the x-y plane to form a substantially narrow surface element 26 corresponding to the desired shape of the surface 24, at the position indicated along the z-axis. After having moved in the x-y plane to cut the surface element 26, the tool 22 is incremented along the z-axis, and the tool is thereafter moved once again in the x-y plane, for example, for purposes of machining another surface element closely adjacent to the element 26. By carrying out this process repeatedly of moving the tool in the x-y plane after being incremented or displaced along the z-axis, the desired contoured or profiled surface 24 may be obtained. This method of machining, moreover, makes it possible to obtain a surface of any desired shape.

When the surface 24 is generated by machining with a conventional ball end mill, the surface possesses a series of ridges which mark the path of the tool and contribute to a resulting roughness of the machined surface.

Figure 4:
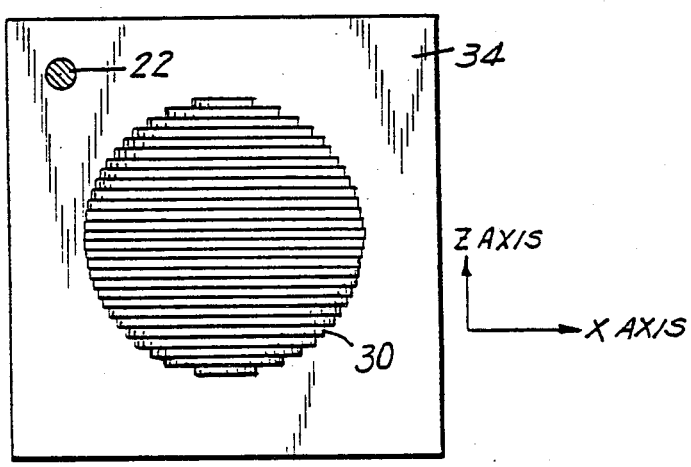
FIG. 4 is a front view of the workpiece of FIG. 3.
Figure 5:
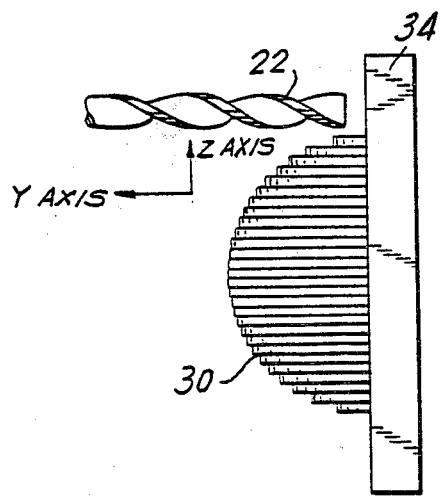
FIG. 5 is a side view of the workpiece of FIG. 3.

A roughened surface is also obtained when machining with a conventional flat face end mill, as shown in FIG. 2. When the flat face end mill 28 is incremented along the z-axis after having been moved in the x-y plane to generate the surface 30, a stepped finish is obtained on the surface of the material 32 being machined. The stepped structure of the rough surface may be readily seen on a plane 34 passed normal to the machine surface as may be seen from FIG. 2, FIG. 4 and FIG. 5.

Figure 3:
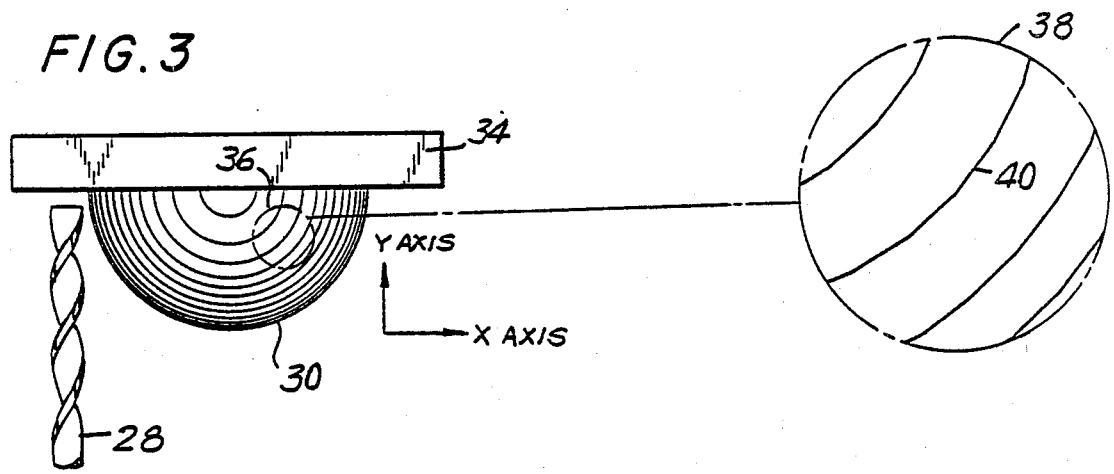
FIG. 3 is a plan view of the surface finish of a workpiece machined with a flat face end mill.

In the plan view of FIG. 3, a small portion 36 of the machine surface 30 is shown in enlarged form by the portion 38. As may be seen from the enlarged portion 38 each contour or path of the tool 28 is comprised of a plurality of straight-lined segments 40, for example. The connecting straight-lined segments 40 correspond to the short straight-lined paths of the tool taken to generate a desired contour. Thus, when moving in the x-y plane, the tool is moved progressively between coordinates interconnected by straight lines. By increasing the number of such coordinates, and thereby the number of straight lines along the path of the tool, the contour may be given a substantially smooth outline in the x-y plane, for example.

A similar roughened surface results when the tool 28 is moved along contoured paths in the z-x plane and incremented along the y-axis. Such an arrangement is shown in FIGS. 6–8, for example. In the view of FIG. 6, a small portion 42 of the surface 44 is shown in enlarged form by the section 46. Straight-lined segments 48 represents again the short successive paths of the tool 28.

In contrast to the rough surfaces obtained when machining surfaces with conventional cutting tools, the present invention provides for an arrangement in which a substantially smoothly machined surface 50 is obtained, as shown in FIGS. 9–11. In viewing FIGS. 9 and 11, it may be seen that a smooth surface is substantially obtainable by connecting successive planes 52 and 54, for example, by a straight-lined segment 56. It may be seen from FIGS. 9 and 11 that the straight-lined segment 56 has a particular slope that is different from the slopes of the corresponding neighboring straight-lined segments interconnecting neighboring planes. Accordingly, if a smooth surface is desired, the cutting tool is required to machine surface elements 56 of varying slope on the surface to be generated. Thus, the cutting tool must generate one surface element with a slope 56 which is different from the slope of the neighboring surface element, for example. By varying the slope cut by the tool, in this manner, a substantially high degree of smoothness may be obtained over the surface to be machined. Added smoothness may also be obtained by subdividing the surface to be machined in a larger number of contours or planes 52, 54, for example. When subdividing the surface in a larger number of contours, in this manner, the segments 56 become correspondingly shorter in length.

The tool 58 provided, in accordance with the present invention, for machining contours with different slopes as required by a desired shape to be generated, is shown in FIG. 12.

The tool 58 is constructed of a surface having a plurality of slopes successively interconnected and commencing from a slope of infinity 60 to a slope approaching zero at some distance from the end of the tool. The tool 58 is constructed so as to possess straight-lined surface elements 62 having slopes corresponding to those that may be required for generating the smooth surface 50 in FIGS. 9–11.

Figure 13:
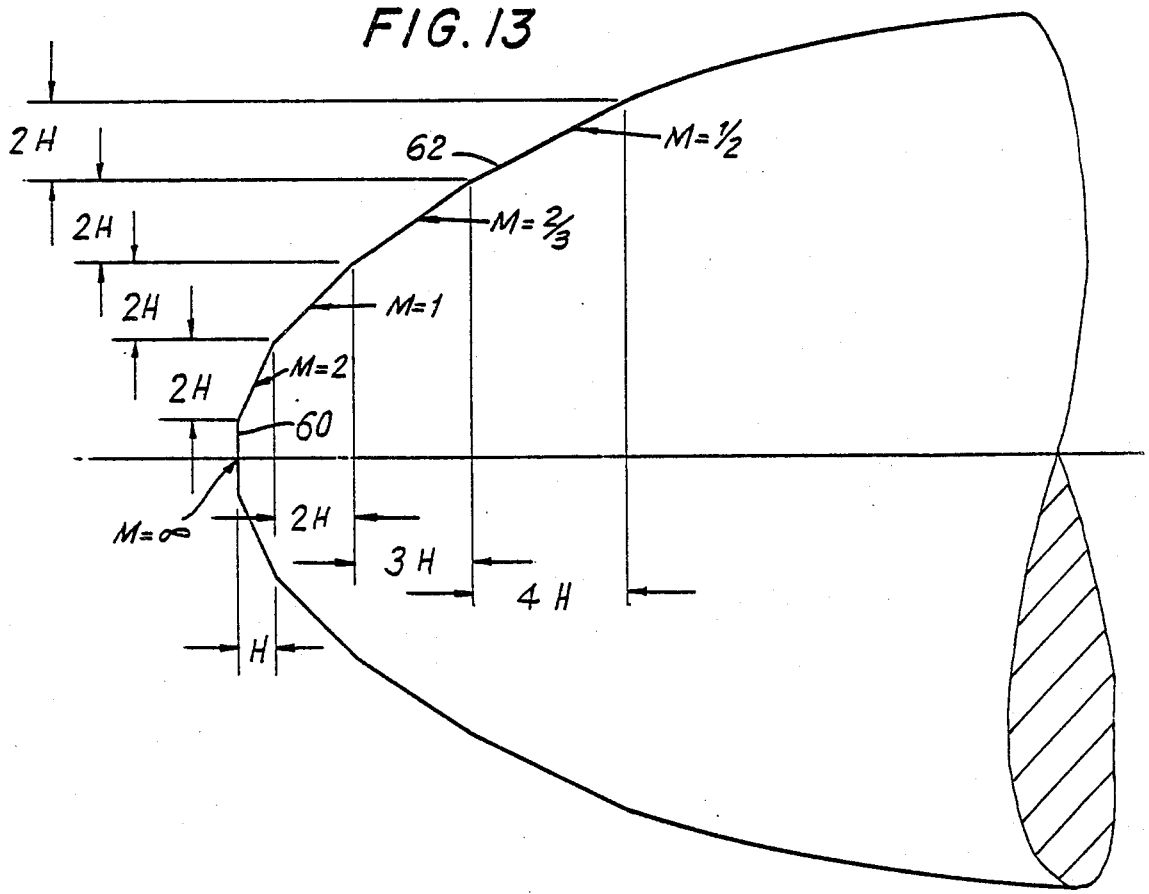
FIG. 13 is another embodiment of the tool of FIG. 12.
Figure 14:
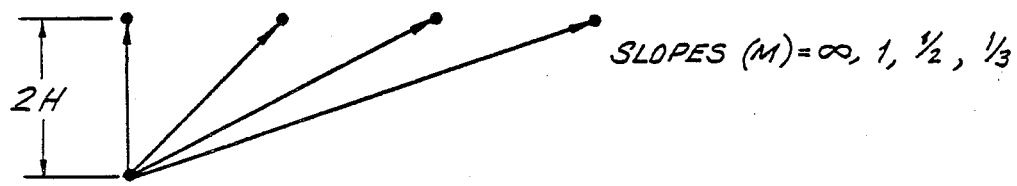
FIG. 14 is a graphical representation of slopes applied to the tool of FIG. 12.
Figure 15:
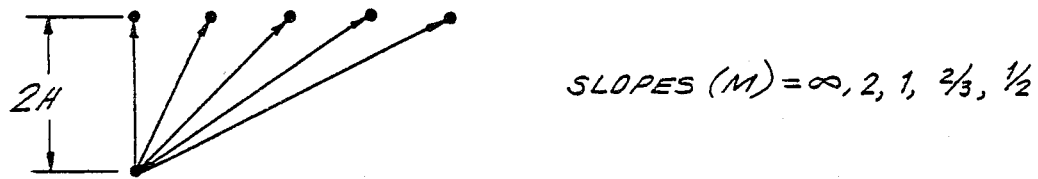
FIG. 15 is a graphical representation of the slopes applied to the tool of FIG. 13.

In synthesizing the proper profile to achieve the desired results by the tool shown in FIG. 12, there may be assumed a spacing H between contours resulting from quantizing the surface to be machined, as may be seen in a plan view of the surface with the contours reproduced thereon. The tool profile is derived by providing allowable slopes M, such as $\infty$, 1, $\frac{1}{2}$, $\frac{1}{3}$, etc. if the spacing between contours is designated by double the amount or 2H, for example, then the resultant tool profile appears as shown in FIG. 13. The selection of slopes in the tool profile of FIG. 13, corresponds to slopes equal to $\infty$, 2, 1, $\frac{2}{3}$, $\frac{1}{2}$, etc. Graphical vector representations of the slopes on the tool in FIGS. 12 and 13 are shown, respectively, in FIGS. 14 and 15.

If the straight-lined segments or increments on the tool surfaces in FIGS. 12 and 13 are selected sufficiently small, it will be found that the profiles of these tools in FIGS. 12 and 13 correspond to parabolic shapes.

To show that the proper tool profile is parabolic, the following proof is constructed in conjunction with FIG. 16. Let the y-ordinates be quantized to Q times the horizontal increments, H. Then as data or coordinates change horizontally between contours, slopes result equal to the vertical distance between contours (shown normalized to one) divided by the allowable horizontal displacement between corresponding points: this may be expressed analytically by, $$M(N) = \frac{dy}{dx(N)} = \frac{QH}{0H}, \frac{QH}{1H}, \frac{QH}{2H}, \frac{QH}{3H}, \frac{QH}{4H}, \text{etc.}$$

From the above relationship, it may be seen that the slope of the $N^{th}$ tool element is Q/N.

To obtain a smoothly machined surface, it is essential to orient the tool so that the tool surface with the proper slope is in contact with the respective surface element to be machined, so that the desired slope of the surface element to be machined is carried out by the corresponding slope on the tool. As a result, each slope on the tool must be maintained for a distance QH=1 transverse to the tool axis so that the portion of the cutter at the proper slope occupies precisely the space between adjacent contours. If the distance along the tool axis over which the slope is held constant is denoted by $\Delta x$, $$\Delta x(N) = \frac{\Delta y}{M(N)} = \frac{QH}{M(N)} = \frac{QH}{Q/0};$$

$$\frac{QH}{Q/1}; \frac{QH}{Q/2}; \frac{QH}{Q/3}; \text{etc.}$$

$$= 0H; 2H; 3H; \text{etc.},$$

from which it may be seen that the length of the $N^{th}$ element is NH.

The y height at the $N^{th}$ element is N+0.5 since the $0^{th}$ element is half above and half below the tool axis.

The total x length at the $N^{th}$ element is the sum of the individual tool portions; i.e., $$x(N) = \sum_{O}^{N} NH = H \sum_{O}^{N} N.$$

Thus, the tool shape profile may be expressed as a parameter of N as shown below.

$$y(N) = (N + \tfrac{1}{2})$$

$$x(N) = H \sum_{O}^{N} N = H [(\tfrac{1}{2}N)(N + 1)] = \frac{1}{2Q} (N(N + 1)$$

Solving for N as a function of y $$y(N) = N + \tfrac{1}{2}$$

Therefore $$N = y(N) - \tfrac{1}{2}$$

Substituting into the expression for x(N).

$$x(N) = \frac{1}{2Q} (N) (N + 1) = \frac{1}{2Q} (y(N) - \tfrac{1}{2}) (y(N) = \tfrac{1}{2} + 1)$$

$$x(N) = \frac{1}{2Q} (y(N)^2 - \tfrac{1}{4})$$

|  | y(N) | y(N)² | x(N) (computed) | x(N) (actual) |
|---|---|---|---|---|
|  | .5 | .25 | 0 | 0 |
|  | 1.5 | 2.25 | .25 | .25 |
| Q = 4 | 2.5 | 6.25 | .75 | .75 |
|  | 3.5 | 12.25 | 1.5 | 1.5 |
|  | 4.5 | 20.25 | 2.5 | 2.5 |
|  | .5 | .25 | 0 | 0 |
|  | 1.5 | 2.25 | 1 | 1 |
| Q = 1 | 2.5 | 6.25 | 3 | 3 |
|  | 3.5 | 12.25 | 6 | 6 |
|  | 4.5 | 20.25 | 10 | 10 |

It may be seen from the above analysis, therefore, that the profile of the cutting tool does actually approximate a parabolic shape. Accordingly, the cutting tool need not be profiled with straight-lined segments as shown in FIG. 16. Instead, the cutting tool may have applied to it a profile having a substantially parabolic shape. Such a cutting tool achieves the desired result of providing a smoothly finished machined surface in a direction which is transverse to the planes of the contours. Whereas the roughness of the machine surface can generally be reduced by spacing the contours closer together, when using conventional tools, for example, the present invention permits wider spacing of such contours to obtain satisfactory results. The wider spacing permitted with the present invention reduces the machining time and thereby the cost of the articles being machined.

One property of the parabolic tool is that the tool diameter at a given distance back from the tool tip is proportional to the number of horizontal quantizing increments between contours. This is illustrated in FIG. 16 by the dashed tool profiles for Q=1, Q=2, Q=4, and Q=8. A tool whose width increases rapidly with increasing distance from the tip as in FIG. 13, is not as suitable for milling fine detail as one with a slower rate of increase corresponding to FIG. 12. Thus, from FIG. 16 it may be seen that the tool with Q=1 is far superior to the other two for cutting fine detail.

In operation of the present invention, the cutting tool is progressively positioned between x-y coordinates along a contour at a given distance along the z-axis, as shown in FIGS. 9-11. The path of the tool between x-y coordinates is computed by means of a conventional computer, for example, and the instructions or commands for displacements of the tool are applied or stored on tape which is played back at the machine tool. The instructions for guiding the machine tool, in this manner, also include instructions for selecting the proper slope on the parabolic tool and applying the selected slope against the surface to be machined so as to result in the desired smoothness. After the tool has been moved in the x-y plane to complete the contour, the tool is incremented or displaced along the z-axis for the purpose of machining along a neighboring contour with a repetition of the displacements of the tool similar to that described for the preceding contour in combination with applying the proper slope surface on the tool to the surface element or contour being machined.

Figure 18:
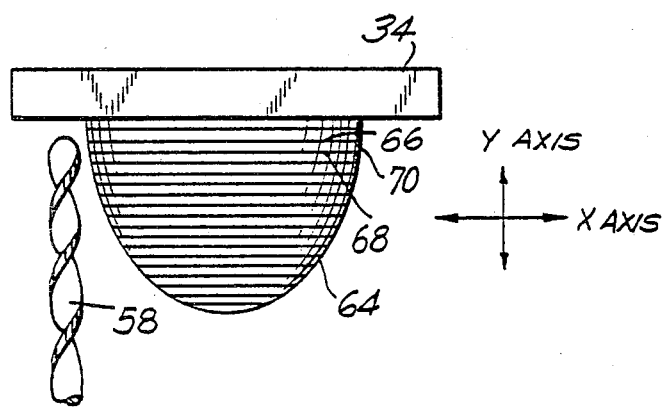
FIG. 18 is a plan view of the workpiece of FIG. 17.
Figure 17:
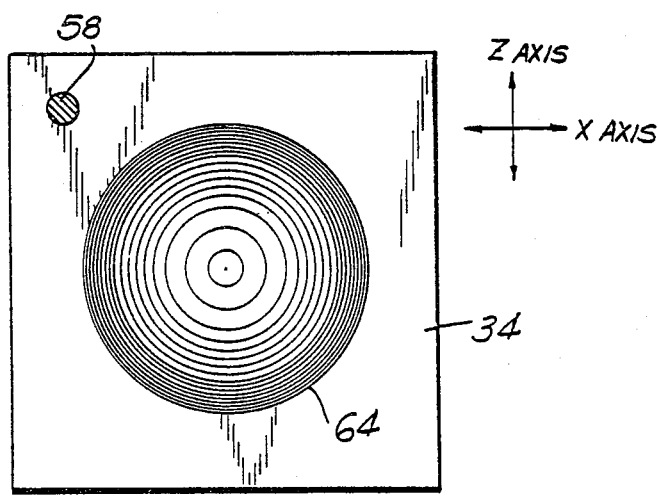
FIG. 17 is a front view of the surface finish of a workpiece machined with a parabolic profile tool, in which the milled contours are normal to the contours of the workpiece shown in FIG. 9.
Figure 19:
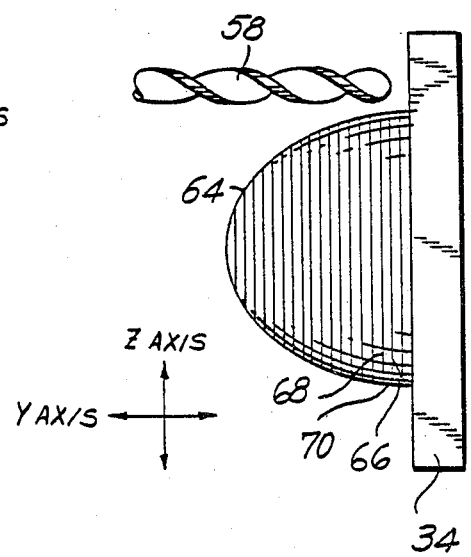
FIG. 19 is a side view of the workpiece of FIG. 17.

It is not essential that the contours lie in x-y planes as illustrated in FIGS. 9-11, to obtain the desired results with the present invention. Equally smooth surfaces may be machined when the contours lie in z-x planes, as shown in FIGS. 17-19. Thus, a surface 64 may be generated by subdividing it with contours between planes 66 and 68, for example. The slope 70 of the contour between the two planes is then machined by placing the proper surface of the parabolic tool in contact with the contour being machined. The final result obtained with the arrangement of FIGS. 17-19 will provide substantially the same smoothness as obtained with the arrangement of FIGS. 9-11.

Without further analysis, the foregoing will so fully reveal the gist of the present invention that others can, by applying current knowledge, readily adapt it for various applications wihout omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A cutting tool with cutting edges having a parabolic profile, said profile being comprised of cutting surfaces interconnected to form said parabolic profile, the slopes on said cutting tool varying in value from zero to infinity, said cutting tool having an axis of rotation and a free end, said cutting tool having cutting edges with slopes varying in value from substantially infinity as said free end of said tool to zero at a predetermined distance along said axis of rotation from the end of said tool, said tool being selectively positioned for locating the cutting surface conforming to the desired slope against the surface to be machined.

2. A cutting tool as defined in claim 1 wherein said cutting edges are comprised of a predetermined number of straight-line segments approximating substantially said parabolic surface.

* * * * *